April 4, 1961  R. H. OLSON  2,978,526
ELECTRODE ASSEMBLY FOR GLASS FURNACE
Filed March 19, 1958  2 Sheets-Sheet 1

INVENTOR.
Ralph Harvard Olson
BY

J. R. NELSON
LEONARD D. SOUBIER
ATTORNEYS

April 4, 1961 R. H. OLSON 2,978,526
ELECTRODE ASSEMBLY FOR GLASS FURNACE
Filed March 19, 1958 2 Sheets-Sheet 2
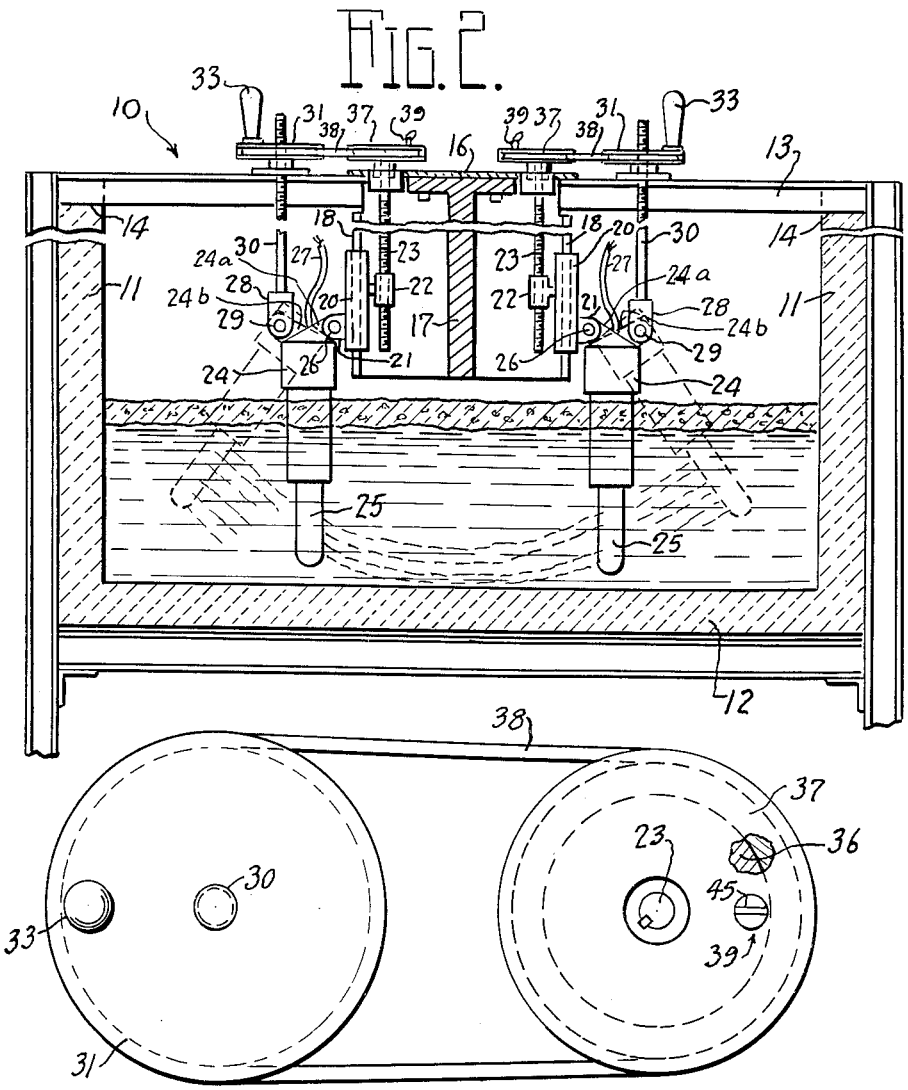
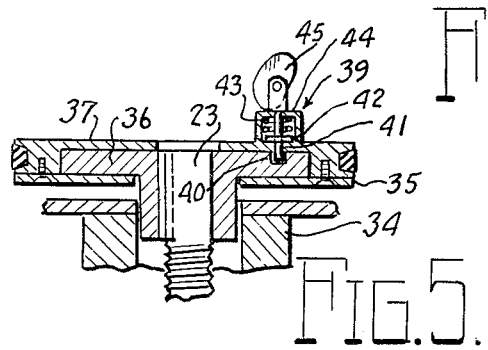
INVENTOR.
Ralph Harvard Olson
BY
J. R. NELSON &
LEONARD D. SOUBIER
ATTORNEYS

United States Patent Office 2,978,526
Patented Apr. 4, 1961

2,978,526
ELECTRODE ASSEMBLY FOR GLASS FURNACE

Ralph H. Olson, Toledo, Ohio, assignor to Owens-Illinois Glass Company, a corporation of Ohio Filed Mar. 19, 1958, Ser. No. 722,452

14 Claims. (Cl. 13—14)

This invention pertains to an electrode assembly and mounting therefor on a glass furnace, and more particularly to an electrode assembly and mounting for use with an open-top or roofless glass furnace.

In an open-top glass furnace, raw batch materials are fed to the melting chamber and spread as a blanket over the top surface of the melted portion that forms the molten glass body. The batch blanket provides a heat retaining blanket therefor. Heat is supplied to the molten glass body generally by electrical resistance heating. The heat of the liquid or molten glass body gradually melts the adjacent portion of the batch blanket.

The heat is applied by placing the tips or end portions of two or more electrodes in the molten glass and connecting the electrodes to a source of electrical current. The electric current flows to the electrode tip, thence through a path in the liquid glass body and to another electrode tip to complete an electrical circuit. The physical location and space between these electrodes establishes the location of the current paths in the glass body. Another contributing factor which may affect the current paths where many electrodes are connected in the same circuit is the particular electrical circuit being employed to energize the electrodes. The molten glass in these current paths offers an electrical resistance inversely proportional to the temperature, and accordingly, this glass is heated according to Joule's law (often referred to as Joule heating effect) as the current traverses the current paths established between electrodes.

It is an important object of the present invention to provide an electrode assembly for mounting electrodes over the open-top of a glass furnace so they depend downwardly to penetrate the batch blanket and extend into the molten glass body for conducting electrical energy between them in current paths established in the liquid glass.

And, a further object of the invention is the provision of such electrode assembly including mountings for each electrode having vertical and angular adjustments of their position with respect to the molten glass body to permit variation of both length and vertical elevation of the current paths with respect thereto.

Another object of the invention is to provide an adjustable electrode assembly that will permit individual adjustment of the vertical elevation of the current paths or variation of the length of the current paths.

Electrodes of this type are generally made up of molybdenum alloy or carbon materials, for example, and either material is susceptible to chemical corrosive effect caused by the entrapped gasses lying between the molten glass surface and the batch line; hence, another object of the invention includes provision of a protective sheath of material over an annular portion of the electrode that will traverse through the batch line and the underlying adjacent surface of the molten glass, and includes a means of measuring the vertical position of the electrode sheath with respect to the batch line.

Still another object of the invention is provision of an electrode assembly having a plurality of electrodes mounted as a unit on the walls of the open-top furnace so that the unit as a whole may be moved and relocated about the furnace permitting, at will, changing the location therein of the area for applying the electric heating to the body of molten glass.

The specific nature of the invention, as well as other objects and advantages thereof, will become apparent to those skilled in the art from the following detailed description, taken in conjunction with the annexed sheets of drawings, on which, by way of preferred example only, is illustrated an embodiment of this invention.

On the drawings:

Fig. 2 is an elevational view, partly in section, taken along line 2—2 of Fig. 1.

Fig. 4 is a plan view of the driving wheels for adjusting the vertical or angular position of each of the electrodes.

Fig. 5 shows, in a sectional elevational view, the detail of the driving wheel and clutch for the threaded driving screw for adjusting the electrode position.

Figure 1:
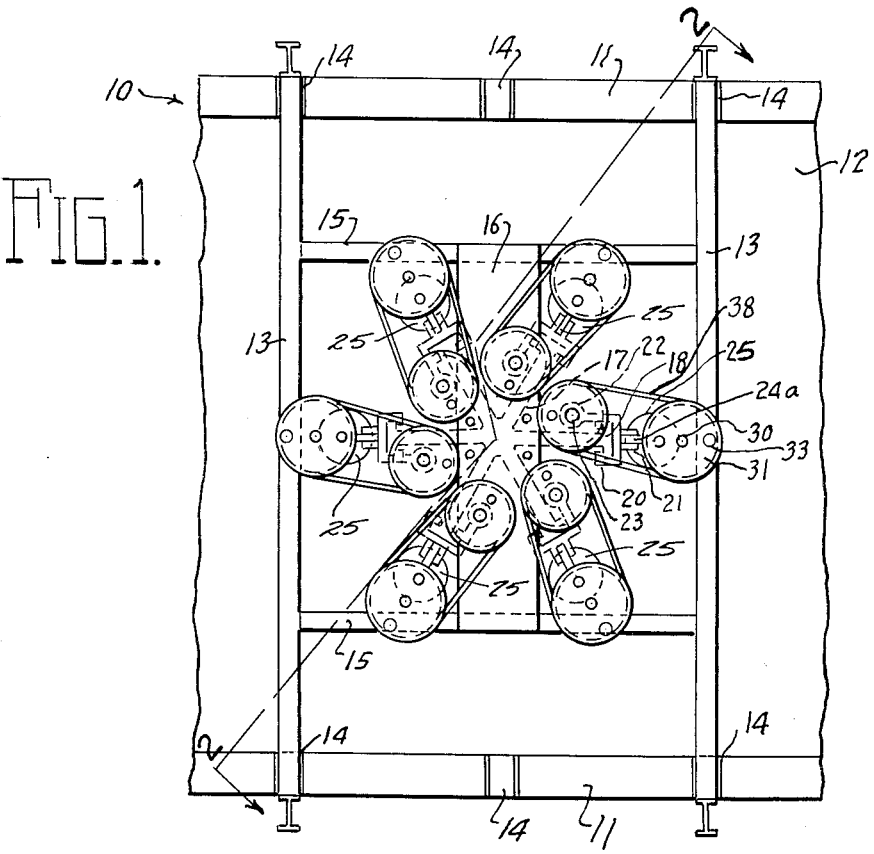
Fig. 1 is a plan view of the electrode assembly of this invention mounted across opposite side walls of an open-top glass furnace, of which a portion is shown.

Referring to Fig. 1, a melting tank 10 of an open-top or roofless glass furnace has opposed side walls 11, opposed end walls (not shown), and a bottom wall 12. Supported at the top of the tank 10 is a supporting frame 13 resting at its ends on the top surface of the side walls 11 in tapered notches 14. The frame 13 includes crossties 15 and a center section 16. Depending from the center section 16 is a guide spider 17, which forms a lower depending portion of the frame 13 (Fig. 2). The spider 17, as herein shown, is comprised of six radially arranged T-shaped members 18. The outer end of the T-shaped members 18 serves as a guiding surface and has a U-shaped carriage 20 fitted thereon for slidable vertical movement over said guide surface. The six T-shaped members 18 are equally spaced about the central axis of the spider 17 so that the U-shaped carriages 20 are arranged at the corners of an equal sided hexagon.

As seen on Fig. 2, each carriage 20 has an integral bracket 21 projecting outwardly and an integral inwardly projecting bracket 22 having a threaded female part to receive a matching driving screw 23. An electrode holder 24 is attached to mount each electrode 25 to project downwardly into the glass body in the tank 10. Each holder 24 is provided with a lug portion 24a. This lug portion 24a fits in bracket 21 on carriage 20 and is held by pin 26 to form a pivot for the electrode. Each electrode is connected into an electrical energizing circuit (not shown) by lead wire 27. Each electrode holder 24 has a second lug portion 24b, spaced laterally from lug 23a thereon, and is pivotally connected to yoke 28 by pin 29. The yoke 28 is integral with the end portion of a driving screw 30. Driving screws 23 and 30 are driven through a pair of hand-operated driving wheels and clutch arrangement, to be presently described.

The driving screws 30 are each engaged with matching threads in the central bore of a driven wheel 31 which is journaled for rotation in a bracket 32 bolted to the horizontal members of the supporting frame 13. The wheel 31 is hand-driven through handle 33. Upon rotation of wheel 31, its internal threaded portion raises and lowers the driving screw 30.

The driving screws 23 are each journaled for rotation in a bearing 34. Each bearing 34 is integrally attached with a central top plate 35 bolted to the top of center section 16 of the supporting frame 13. The upper end of each driving screw 23 is keyed to a driven wheel 36. A driving wheel 37 encloses an annular portion of the wheel 36 and is capable of slipping on the latter to permit independent rotation between the two wheels. The driving wheel 37 is coupled for rotation with wheel 31 through a belt or chain 38 (Fig. 4). The two wheels 31 and 37 are rotated in unison by the handle 33. The driven wheel 36 (Fig. 5) has one or more axially bored notches 40 located radially thereon. The driving wheel 37 carries a spring-loaded clutch assembly 39 which includes a plunger 41 adapted to register with notch 40 in wheel 36. Plunger 41 carries an integral washer 42. A coil spring 43 is compressed between washer 42 and housing 44 of assembly 39. A hand-operated cam lever 45 is pivotally connected to the outer end of the plunger 41 and may be rotated to bear against the outer surface of housing 44 to lift plunger 41 against the spring and hold it disengaged from notch 40 in wheel 36. The above described assembly 39 thus permits engagement and disengagement of the wheels 36 and 37 to operate as a clutch for operation of driving screw 23.

By the above described apparatus, it is seen that the electrodes 25 may be each adjusted vertically in glass body melter 10 or may be adjusted angularly in their position with respect to each other in the glass body. To make the vertical adjustment of one of the electrodes, the wheels 36 and 37 are coupled together through release of cam 45 and engagement of plunger 41 in notch 40. Wheel 31 is then rotated by handle 33 and drives both screws 30 and 23 simultaneously. The electrode 25 will thus be raised or lowered by driving its carriage 20 along the T-shaped guide member 18. In this manner the angular position of the electrode will be maintained constant since both driving screws 23 and 30 will be driven vertically a like amount. The vertical elevation of the electrode in the glass body is accordingly adjusted to the desired level.

The length of the current paths between electrodes 25 may be varied by making angular adjustment of the electrodes (see Fig. 2). This is accomplished by disengaging the plunger of clutch assembly 39 so that wheel 37 may rotate independently of wheel 36. Hence, when the wheel 31 is rotated by handle 33, only drive screw 30 will be driven which will pivot electrode 25 about its pin 26 at the connection between its holder 24 and carriage 20 (see dotted outline of electrodes in Fig. 2).

Another important feature on the adjustability of the electrode assembly of this invention is seen from Fig. 1. The entire electrode assembly is mounted as a unit on the supporting frame 13. It is fastened to the furnace only at the resting points in the tapered notches 14 at the upper side walls 11. It is contemplated by this invention to provide a series of these tapered notches 14 along the upper edge of the side walls 11 of the furnace so that the electrode assembly may be hoisted by an overhead crane or other lifting devices and shifted longitudinally of the tank 10 as a unit to position the assembly at a new location. This will permit changing the location of applying the heat to the glass in the tank without altering the furnace structure or shutting it down to relocate the heating electrodes.

In the foregoing description, three possible adjustments are pointed out for altering the electric heating pattern in the furnace as may be desired.

Figure 3:
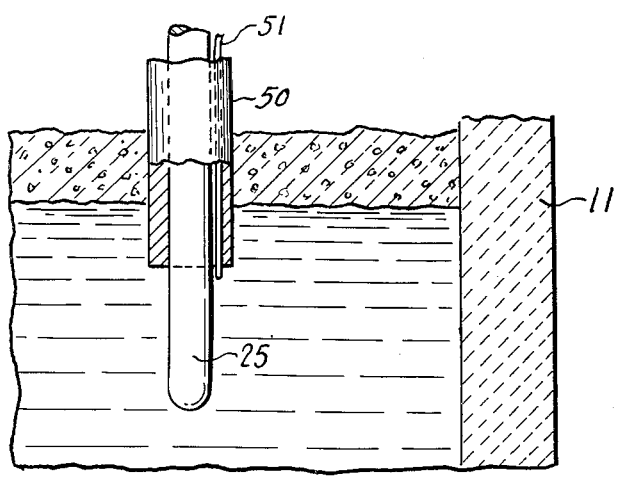
Fig. 3 is a fragmentary elevational view of one of the electrodes shown in operating position in the furnace and including, partly in section, a portion of the refractory sheath of the invention for protecting the electrode against chemical corrosive wear in the vicinity of the batch line.

In an electrode installation of this type, the electrodes extend down through the batch blanket and onto the molten glass, as previously explained. It has been found that the electrodes will be subjected to accelerated wear or "neck down" at a point thereon corresponding to the juncture between the batch line and the molten glass level due to chemical effect on them of entrapped gases between the molten glass and the batch blanket. It is, therefore, an important feature of this invention to include a sheath of protective material, such as quartz or zac refractory, in the form of a sleeve 50 fitted over electrode 25. This sleeve will protect the electrode body against the corrosive effect of these gases at the molten glass level. It is important that the sleeve 50 extend over such a portion of the length of the electrode that the electrode will be covered at all times at the portion thereof adjacent to and at the molten glass level while it is inserted in operating position in the glass. As shown on Fig. 3, the sleeve 50 may be provided with a conventional thermocouple tube 51 connected to a thermocouple device for indicating the position or elevation of the lower end of sleeve 50 relative to the molten glass surface. As seen on Fig. 3, the electrode 25 and sleeve 50 are inserted into the molten glass matrix or pool through the overlying layer of batch materials. Below the batch line exists a viscous layer which includes entrapped gases. As between the molten glass matrix, this viscous layer, and the batch layer, there exists an inherent temperature gradient. The greatest variation of temperature within these three layers exists between the molten glass matrix and the viscous layer. Therefore, the temperature of the material adjacent the lower end of sleeve 50 indicates the relative position of the lower end of the sleeve in the three mentioned layers. More significantly, it indicates the sleeve's position with respect to the viscous layer. As above stated, the shielding of the electrode as provided by the sleeve is most essential through this viscous layer to prevent chemical attack of the electrode by the gases present in this layer. Thus, a sharp change or drop in temperature measurement as made by the thermocouple indicates that the physical relationship between the lower end of the sleeve and the molten glass has changed such that the unshielded end of the electrode is in the viscous layer.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. In an electrode assembly including means supporting an electrode to project through a batch blanket and into an adjacent underlying molten glass pool in an open top glass melting furnace, the improvement for protecting the electrode body against corrosive effect, said improvement comprising an annular sheath of refractory material mounted on the electrode, said sheath extending through a portion of the length thereof and into the molten glass pool in the furnace at all times while the electrode is supported in operating position, and means carried by said sheath and responsive to temperature for measuring the vertical position of the electrode sheath with respect to the surface of the molten glass.

2. An electrode mounting assembly for mounting a plurality of electrodes in operating position in a glass melting furnace containing a body of molten glass comprising an overhead supporting frame spaced above the molten glass level, at least one electrode of said assembly having an operative connection to an electrical energizing circuit, means connected to said supporting frame for supporting each electrode, said means arranged for vertical adjustment of said electrode with respect to the molten glass level, a further means on said supporting frame operatively connected to said electrode for adjusting the angular position of said electrode with respect to the vertical, a refractory sheath covering each said electrode and extending downwardly into the molten glass, and means in said sheath for measuring the vertical position of each said electrode sheath with respect to said molten glass surface.

3. The combination defined in claim 2, wherein the means for vertically adjusting said electrode includes a vertical guiding surface on said frame, an electrode holder on said electrode, a corresponding carriage connected to said holder and engaged with said guide surface, a vertically disposed adjusting screw operatively connected at one end to drive said holder, and a driving member mounted for rotation on said frame for driving said screw, said member being rotatable to raise and lower the electrode by said screw.

4. The combination defined in claim 3, wherein the means for angularly adjusting the position of the electrode includes a pivotal connection between the carriage and the holder, a second adjusting screw operatively connected to the holder remote from the pivotal connection of it and the carriage, a second driving member mounted for rotation on said frame for driving the second adjusting screw, said second member being rotatable to drive said second screw and angularly adjust the position of said electrode.

5. The combination defined in claim 4, including means for rotating said threaded members for driving the vertical adjusting screw and the second adjusting screw collectively.

6. An electrode mounting assembly for mounting a plurality of electrodes in operating position in a glass melting furnace comprising an overhead supporting frame, at least one electrode of said assembly being arranged for operative connection to an electrical energizing circuit, a vertically disposed guide surface on said frame for each electrode, an electrode holder on each said electrode, a carriage pivotally connected to said holder and engaging said guide surface, a first adjusting screw operatively connected at one end to said holder, a first driving member mounted for rotation on said frame and engageable with said screw for driving said screw for raising and lowering said electrode, means for selectively effecting driving engagement of said first driving member and said first screw, a second adjusting screw pivotally connected to said holder remote from the pivotal connection of said carriage therewith, a second driving member mounted for rotation on said frame and engageable with said second screw for angularly adjusting the position of said electrode, and means coupling said first and second driving means to permit alternative operation of said first and second adjusting screws collectively and said second adjusting screw individually.

7. In an electric heating apparatus for passing electric currents through molten glass of a body thereof contained in a glass furnace, the combination comprising a plurality of electrodes mounted to project into the molten glass body through its top surface and adapted for connection to a source of electrical energy, thereby establishing electric current paths between pairs of said electrodes, means adjustable for adjusting the vertical elevation of each of the electrode paths, and means adjustable for adjusting the angular position of the electrodes, thereby varying the length of each of said paths.

8. The combination defined in claim 7, wherein the electrodes are each sheathed in a refractory jacket covering a portion of the length thereof and extending through the top level of the molten glass body so that whenever said electrodes are capable of establishing said current paths through the molten glass body, said jackets protect their electrodes in a region near the top surface level of the body against chemical attack.

9. In an electric heating apparatus having at least one pair of electrodes submersed in the molten glass body contained in a glass melting furnace and arranged to be energized by a source of electric current thereby establishing a current path through the glass between the electrode pairs, the improvement for controlling the path of the current through the glass body, said improvement comprising means for adjusting the vertical elevation of the current path between each pair of electrodes, and means for adjusting the length of the current path between each pair of electrodes, whereby heat may be applied to the glass throughout a selected plane of said glass body.

10. In an open-top glass melting furnace, wherein batch materials are fed as a blanket and floated on a molten glass body therein, the combination comprising an overhead supporting frame mounted on the furnace, a plurality of electrodes extending through said batch blanket and inserted at one end into the molten glass of said body, means for slidably and pivotally mounting each said electrode on said frame, said electrodes being adapted for vertical movement with respect to said glass body, first driving means for effecting said vertical movement, and second driving means connected individually to each of said electrodes for pivoting said electrodes on their said mounting means, thereby effecting an angular movement thereof with respect to the glass body.

11. The combination defined in claim 10, wherein there are included six said electrodes mounted on said frame by six said means located thereon and spaced apart horizontally to lie as the corners of a hexagon.

12. In combination, an open-top glass melting furnace having a plurality of vertically disposed side and end walls, and an electrode mounting assembly for mounting electrodes in operating positions on said furnace for heating and melting glass therein contained by passing an electric current through the glass between the electrodes, said assembly comprising a plurality of electrodes, an electrode supporting frame supported in removable fashion between two of the walls of the furnace, said frame being constructed and arranged to be lifted and relocated in resting relationship at spaced points on two of the walls of the furnace, and means connecting each of said electrodes to depend downwardly from said supporting frame and into operating position in the furnace, said electrodes being carried with said frame, whereby relocating the supporting frame on the furnace walls will correspondingly change the location within the furnace where the heating is applied between the electrodes.

13. The combination defined in claim 12, wherein a series of matching notches is provided at the upper edge of opposed side walls of the furnace and located to define a plurality of supporting frame positions therealong and at least one matching portion near each end of the supporting frame is provided to nest in one of said notches thereat to locate said frame in one of the positions longitudinally of the furnace.

14. The combination defined in claim 12, wherein the means connecting each of the electrodes to the supporting frame includes a vertical adjustment of the electrode with respect to the frame and an angular adjustment of the electrode with respect to the frame, and driving means for making said adjustments, said driving means being operable individually and collectively.

References Cited in the file of this patent

UNITED STATES PATENTS

| | | |
|---|---|---|
| 1,267,317 | Erskine | May 21, 1918 |
| 1,499,922 | Hadaway | July 1, 1924 |
| 1,594,496 | Clark | Aug. 3, 1926 |
| 1,691,365 | Woodson | Nov. 13, 1928 |
| 2,419,383 | Ames | Apr. 22, 1947 |